United States Patent
Wang

(10) Patent No.: US 9,705,678 B1
(45) Date of Patent: Jul. 11, 2017

(54) FAST CAN MESSAGE AUTHENTICATION FOR VEHICULAR SYSTEMS

(71) Applicant: Symantec Corporation, Mountain View, CA (US)

(72) Inventor: Qiyan Wang, Mountain View, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 168 days.

(21) Appl. No.: 14/475,404

(22) Filed: Sep. 2, 2014

Related U.S. Application Data

(60) Provisional application No. 61/981,070, filed on Apr. 17, 2014.

(51) Int. Cl.
*H04L 9/32* (2006.01)

(52) U.S. Cl.
CPC ................................. *H04L 9/3242* (2013.01)

(58) Field of Classification Search
CPC ....... H04L 9/3242; H04L 63/12; H04L 21/57; H04L 21/575
USPC ..................... 713/2, 181, 187, 193, 168, 170
See application file for complete search history.

(56) References Cited

U.S. PATENT DOCUMENTS

| | | | | |
|---|---|---|---|---|
| 6,496,885 B1 * | 12/2002 | Smart | ...................... | H04L 29/06 710/100 |
| 6,665,601 B1 * | 12/2003 | Nielsen | ................... | H04L 12/40 701/50 |
| 9,231,936 B1 * | 1/2016 | Wang | ...................... | H04L 63/08 |
| 2010/0268949 A1 * | 10/2010 | Schuetze | ................. | H04L 9/002 713/168 |
| 2011/0083015 A1 * | 4/2011 | Meier | ................... | H04L 9/3236 713/176 |
| 2011/0138188 A1 * | 6/2011 | Lee | ......................... | G06F 21/57 713/187 |
| 2014/0040992 A1 * | 2/2014 | Koide | ................... | H04L 9/3242 726/4 |
| 2014/0310530 A1 * | 10/2014 | Oguma | ..................... | H04L 9/32 713/181 |
| 2015/0033016 A1 * | 1/2015 | Thornton | .............. | H04L 9/0825 713/171 |
| 2015/0089236 A1 * | 3/2015 | Han | ...................... | H04L 9/3242 713/181 |

(Continued)

OTHER PUBLICATIONS

Hendrik Schweppe et al, Car2X Communication: Securing the Last Meter, IEEE, 2011.*

(Continued)

*Primary Examiner* — Shanto M Abedin
(74) *Attorney, Agent, or Firm* — Maschoff Brennan

(57) ABSTRACT

A method for authenticating messages is provided. The method includes calculating a hash value based on a key and a message count value and receiving a data message associated with the message count value. The method includes receiving an authentication message that includes the message count value and a message authentication code derived from the data message, the message count value and the key. The method includes applying portions of the data message to look up portions of the hash value and combining the portions of the hash value to form a verification version of the message authentication code. The method includes determining whether the message authentication code matches the verification version of the message authentication code.

20 Claims, 9 Drawing Sheets

(56) References Cited

U.S. PATENT DOCUMENTS

2015/0270968 A1* 9/2015 Nairn .................. H04L 9/32
713/181

OTHER PUBLICATIONS

Dennis K. Nilsson et al, A framework for self-verification of firmware updates over the air in vehicle ECUs, IEEE, 2008.*
Qiyan Wang et al, VeCure: A Practical Security Framework to Protect the CAN Bus of Vehicles, IEEE, 2014.*

* cited by examiner

FAST CAN MESSAGE AUTHENTICATION FOR VEHICULAR SYSTEMS

This application claims benefit of priority from U.S. Provisional Application No. 61/981,070, filed Apr. 17, 2014, which is hereby incorporated by reference.

BACKGROUND

Vehicles are being revolutionized with rapidly increasing adoption of modern computing and communication technologies in order to improve both user experience and safety for vehicle owners. As a result, vehicular systems that used to be closed systems are opening up various interfaces, such as cellular, 3G/4G, Bluetooth, etc., to the outside world. These interfaces introduce new opportunities for cyber attacks. There are multiple of Electronic Control Units (ECUs) installed on a modern vehicle and the ECUs communicate with each other (e.g. for sending/receiving control commands and system data) through a Controller Area Network (CAN), which is a broadcast-based bus network. There are reports of cyber attacks on vehicular systems, where an attacker compromises an ECU (perhaps through the external interface of this ECU) or connects a compromised device to the OBD-II (onboard diagnostics, second generation) port that is also connected to the CAN bus and further leverages the breach point to inject illegitimate messages on the CAN bus using spoofing to control the vehicle.

A root cause of attacks on vehicular systems is lack of authentication on CAN messages. However, it is very challenging to design a practical message authentication mechanism for the CAN bus, because the vehicular system requires very low message processing latency and ECUs typically have very limited computational power. Existing cryptographic authentication schemes are too computationally expensive to meet the requirement.

The embodiments arise in this context.

SUMMARY

In some embodiments, a method for authenticating messages is provided. The method includes calculating a hash value based on a key and a message count value and receiving from a first electronic control unit, a data message associated with the message count value. The method includes receiving from the first electronic control unit, an authentication message that includes the message count value and a message authentication code derived from the data message, the message count value and the key. Calculating the hash value is performed by a second electronic control unit prior to the receiving the data message and prior to the receiving the authentication message. The method includes applying portions of the data message to look up portions of the hash value and combining the portions of the hash value to form a verification version of the message authentication code. The method includes determining whether the message authentication code matches the verification version of the message authentication code, wherein the applying, the combining and the determining are performed by the second electronic control unit.

In some embodiments, a tangible, non-transitory, computer-readable media having instructions thereupon which, when executed by a processor, cause the processor to perform a method. The method includes counting messages received from an electronic control unit and deriving a message count value, for a message to be received from the electronic control unit, based on the counting. The method includes generating a hash value from the message count value and a key and receiving a data message from the electronic control unit via a vehicular communication network or bus. The method includes receiving the message count value and a message authentication code, from the electronic control unit, via the vehicular communication network or bus. The method includes generating a verification version of a message authentication code from the data and the hash value corresponding to the message count value and verifying whether the message authentication code and the verification version of the message authentication code match.

In some embodiments, a vehicular system is provided. The system includes an electronic control unit configured to couple to a vehicular communication network or bus. The electronic control unit has a hash calculator, a message authentication code generator, and a memory configured to store a key and at least one hash value. The electronic control unit is configured to apply the hash calculator to a message count value and the key to produce a hash value in advance of receiving a data message having data and associated with the message count value. The electronic control unit is configured to generate a verification version of a message authentication code via application of the message authentication code generator to the data, the message count value and the hash value, in response to receiving the data message associated with the message count value and receiving an authentication message having the message count value and a message authentication code. The electronic control unit is configured to compare the verification version of the message authentication code to the message authentication code received in the authentication message, to verify the data received in the data message.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The embodiments provide a practical security framework for vehicular systems, which address the message authentication issue of the CAN bus. The system is designed to be compatible with existing vehicle system architectures, and employs a trust group structure and a message authentication scheme with offline computation capability to minimize deployment cost and online message processing delay. With an increasing need for better safety, entertainment, and usability on vehicles, vehicular systems are becoming more and more complex, providing more functionalities than ever before in order to meet the demands. For example, almost all of the advanced models of vehicles from major car manufactures are providing or plan to provide all or a subset of the following functionalities: Bluetooth, 3G/4G connectivity, cellular connectivity, voice control, Over-The-Air (OTA) diagnostics & updates, and automatic collision avoidance. In addition, Vehicle-to-Vehicle (V2V) and Vehicle-to-Infrastructure (V2I) communication systems are being widely adopted to improve drivers' safety and traffic management.

While these features greatly improve the driver's experience and provide various new interfaces to interact with the vehicle, these interfaces create new opportunities for attackers to break into the vehicular system. An attacker can implant malware to an Electronic Control Unit (ECU) (more specifically, the telematics unit) through cellular or Bluetooth interfaces. Vehicular systems use a Controller Area Network (CAN) to interconnect all the ECUs. A CAN is a broadcast based communication system without source authentication. Consequently, a compromised ECU can impersonate other ECUs by sending spoofed messages, thus gaining full control of the vehicle. In some vehicles there are two CANs on the vehicle, in which case the two CANs are connected via a bridge unit that forwards messages from one CAN to the other.

The security framework described herein may be referred to as VeCure. VeCure adopts a trust group based structure to organize ECUs with different trust levels, in order to minimize the key distribution & management cost while protecting the vehicular system from the message spoofing attack. VeCure employs a message authentication scheme, which can minimize the online message processing delay at both the sender and the receiver ends by pre-calculating heavy-weighted functions, such as cryptographic hash functions. In addition, VeCure incurs very little communication overhead, and is fully compatible with any existing vehicular system's architecture, requiring no special support from car manufactures. The embodiments provide a security framework to protect the CAN bus of vehicular systems that minimizes the key initialization and management costs and a design of CAN message authentication scheme that leverages offline computation to minimize online message processing delay and communication overhead.

Figure 1:
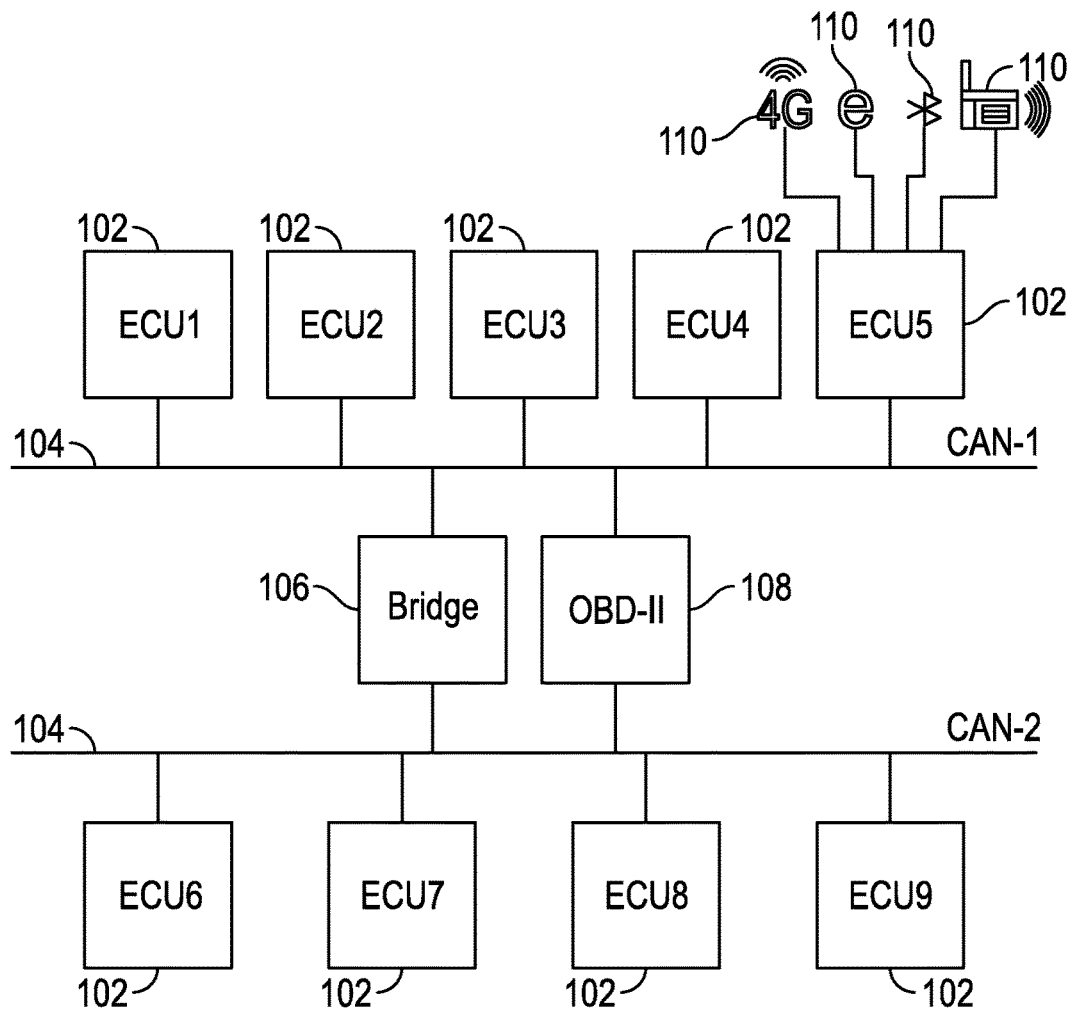
FIG. 1 is a schematic diagram illustrating an example of one architecture of vehicular systems in accordance with some embodiments.

Depending on the model, a vehicle consists of 20 to 100 Electronic Control Units (ECUs), such as the Engine Control Unit, Body Control Unit, Transmission Control Unit, etc. Each ECU controls a particular function of the vehicular system. As illustrated in FIG. 1, all ECUs 102 are connected to a Controller Area Network (CAN) bus 104. In most cases, there are two CAN buses 104 on the vehicle, and they are interconnected through a bridge unit 106, which forwards messages from one CAN bus 104 to the other. Some ECUs 102 have external interfaces 110, such as cellular interfaces, Bluetooth interfaces, Universal serial bus (USB) interfaces, radio interfaces, etc. Typically most ECUs 102 only communicate with the CAN bus 104. An OBD-II port 108 is mainly used by dealers or vehicle engineers to perform diagnostics on a vehicle. In particular, an OBD-II diagnostics device can be coupled to the vehicle through the OBD-II port 108 to conduct a diagnostic session by feeding inputs or reading outputs from an ECU 102, writing or reading a particular memory section on an ECU 102, and even flushing the firmware of an ECU 102. Recently, there have been an increasing number of OBD-II devices provided for consumers, which can communicate with a user's smart phone over a Bluetooth connection, USB connection or Cellular connection, and allow the user to easily monitor mechanical status of the vehicle, diagnose issues, and even remotely control the vehicle.

Figure 2:
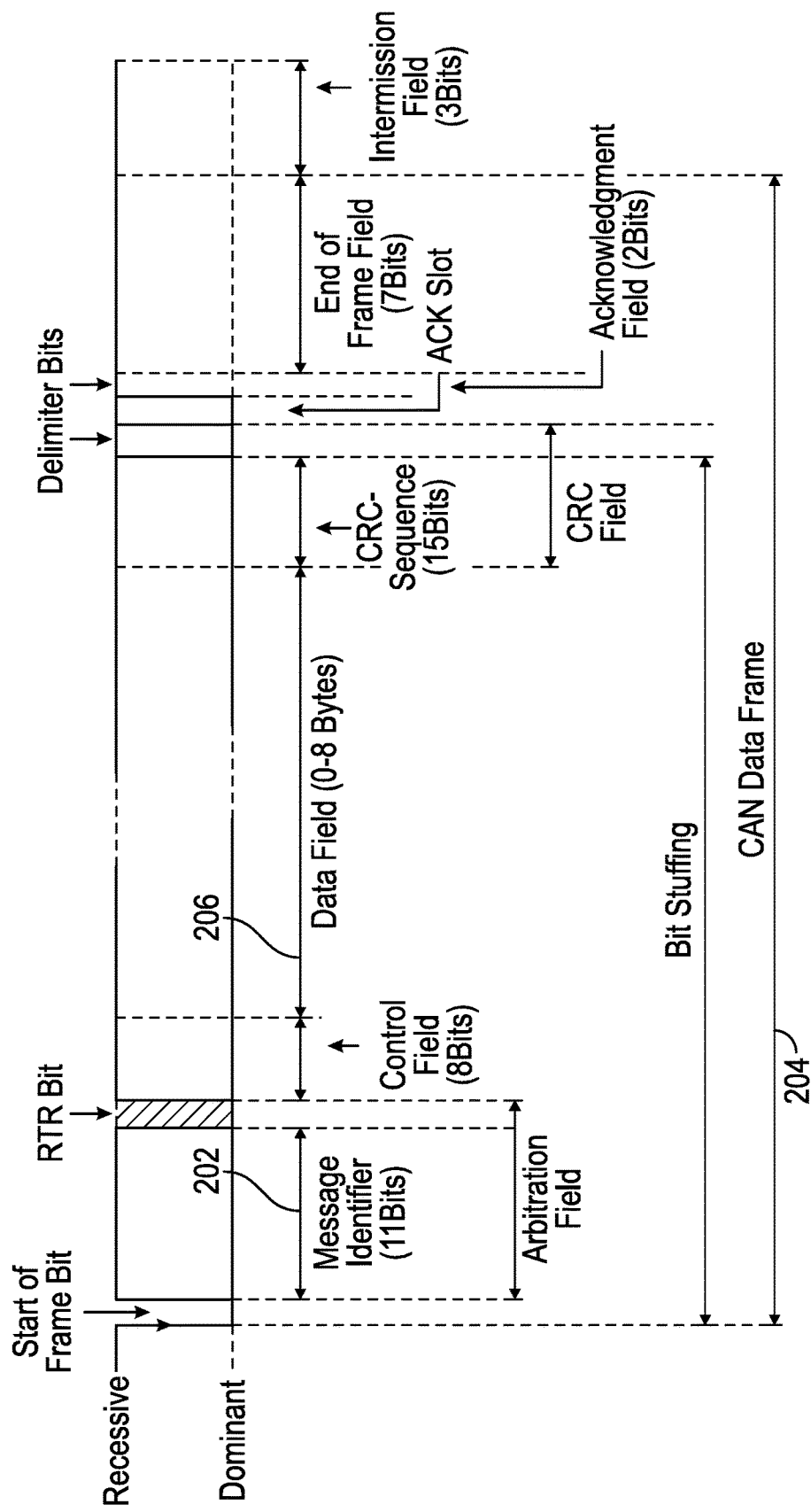
FIG. 2 is a schematic diagram illustrating a Controller Area Network (CAN) data frame structure where each frame contains an 11-bits message identifier and up-to-8-bytes data in accordance with some embodiments.

CAN is a broadcast based communication network, wherein any node connected to the CAN bus 104 can send a message to the CAN bus 104, and the message will be received by all the other nodes on the network. As illustrated in FIG. 2, CAN adopts a publish/subscribe mechanism to deliver messages to interested parties. In particular, each node is assigned an 11-bit message identifier (ID) 202, which is embedded in the header of each CAN frame 204 a node sends out. A receiving node uses a number of masks to filter out irrelevant messages based on their message IDs. A CAN frame 204 contains a data field 206, which can carry up to 8-bytes of application level data. There is an extended CAN protocol that allows 18 additional bits for the message identifier (29 bits in total). CAN does not provide any source authentication mechanism. As a result, a malicious node X on the network can easily inject a spoofed message containing malicious content onto the CAN bus 104 by impersonating a legitimate node Y, and a node Z that receives the message is unable to distinguish whether the message originates from the claimed source Y or a spoofing node.

Some embodiments that prevent the spoofed message injection attack add a cryptographic authentication code to each CAN message, which can be verified by receiving nodes. The calculation of authentication codes is seeded with a cryptographic key that is only known to legitimate nodes. However, such an authentication scheme for a CAN must be able to operate efficiently in the resource limited characteristics of vehicular systems. Most ECUs on a vehicle have very limited computational power, e.g., with processors operating at about the 10 MHz level, and thus it takes much longer to calculate a cryptograhic function on an ECU 102 than on a personal computer. For example, calculating a SHA-3 hash function takes about 2 ms which is too long for the vehicular system where some ECUs 102, such as an Engine Control Unit, send messages every 10 ms. Therefore, the authentication scheme must be computationally efficient. Each CAN message is limited to 8-bytes data, all of which is subject to be claimed by applications defined by car manufactures. Therefore, the size of the authentication code generated for each CAN message must be minimal in order to minimize the number of additional messages to be transmitted. There is an increasing number of ECUs 102 installed on a vehicle to provide advanced features, and in the near future most vehicles will include more than 100 ECUs. Hence, the mechanism to initialize cryptographic keys on ECUs incurs minimum cost and is able to scale to a potentially large number of ECUs.

Figure 3:
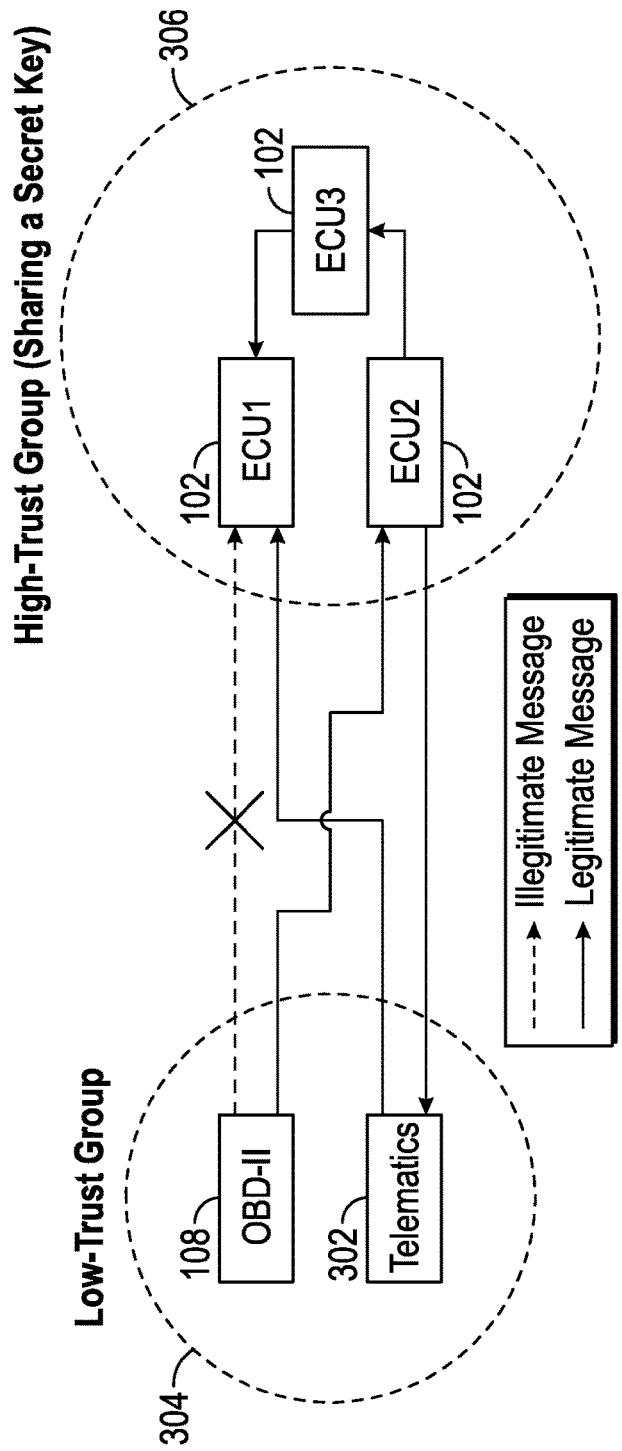
FIG. 3 is a schematic diagram illustrating an example of trust groups of ECUs in accordance with some embodiments.

As we mentioned above, most ECUs 102 on a vehicle have no external interfaces and thus are much more difficult to compromise. On the other hand, for those ECUs 102 with external interfaces, such as telematics and OBD-II port 108 (the OBD-II port 108 may be characterized as a virtual ECU), the adversary can exploit the exposed interfaces remotely. The embodiments divide ECUs 102 into different groups based on their trust levels. A trust level represents how easy it is for an adversary to compromise the ECU 102. For instance, as shown in FIG. 3, the telematics 302 and the OBD-II port 108 are included in the low-trust group 304 and the remaining ECUs 102 form the high-trust group 306. Nodes in the high-trust group share a secret symmetric key Kh (e.g., 128 bits in some embodiments), which is used to calculate authenticated codes for messages they send. Nodes in the low-trust group do not need to and cannot produce authentication codes for their outgoing messages, because they do not have access to the secret symmetric key Kh.

In some embodiments it is possible to have more than two trust groups 304, 306, e.g., an additional medium-trust group to contain ECUs 102 that have limited external interfaces, such as the Tire Sensing Module which can communicate with tire sensors through very low bandwidth wireless links. In that case, each node in the medium-trust group is given a secret key Km, and those in the high-trust group 306 are given both Km and Kh so that they can verify messages from nodes in the medium-trust group. It should be appreciated that this approach does not prevent a node from impersonating or cheating another node in the same group. However, this can be solved by further partitioning the group into subgroups and assigning different keys to them. While the embodiments refer to two trust groups 304, 306, it should be appreciated that this is not meant to be limiting. The trust group based key management enables the number of keys to be independent of the number of ECUs 102, which improves the scalability of the system and reduces the costs of initializing and storing keys.

In contrast to the Internet Protocol, the identifier of a CAN message is a message ID that indicates the type and purpose of the message, rather than a source or destination address. Hence, it is possible that two ECUs 102 produce messages with the same message ID. In order to unambiguously identify the origin of a CAN message, each ECU 102 is assigned a unique node ID at the initialization phase. The node ID is used to generate and verify authentication codes (to be elaborated later). The size of each node ID is 1 byte in some embodiments, which can accommodate up to 256 ECUs 102. In addition, to resist the replay attack, each receiving node verifies whether a received message is fresh or not. A time stamp based approach is not applicable to the vehicular system because most ECUs 102 do not have physical clocks and using an out-of-band time synchronization among these ECUs 102 would add extra implementation complexity and performance overhead. The embodiments provide a session number and message counter to uniquely identify a CAN message. A session number is used to index each driving session. At the initialization, the session number is initialized as 0 and incremented by 1 each time the CAN bus 104 is powered up (i.e., the vehicle is started). Utilizing 2 bytes for the session number supports 65536 sessions without overflow. At the initialization stage, a dealer's device is connected to the OBD-II port 108 to conduct a diagnostic session, during which the initial value of session number (i.e., zero), node IDs, and Kh are written to the specified locations on the flash memory of corresponding ECUs 102. Then, upon each start-up, these values can be directly read from the flash memory into the main memory.

A message counter is a short-lived counter for messages with a particular message ID sent by an ECU 102, and is reset to zero whenever a new session starts. For instance, suppose ECUs 102 subscribes messages with message ID X from both ECU2 and ECU3 and messages with message ID Y from ECU3. ECUs 102 as a receiving node needs to maintain three message counters MC(x, ECU2), MC(x, ECU3), and MC(y, ECU3), and these counters need to be maintained by the corresponding senders as well. The message counter is embedded in the authentication message that is sent right after the original data message. To save space on the authentication message, 2 bytes out of the 8-byte data field are used to carry the message counter, which can tolerate up to 65536 lost messages. Since the message counter will overflow after 65536 messages being sent, the embodiments let both the sender and the receiver locally maintain an overflow counter to count how many times the corresponding message counter has overflown in a session. The overflow counter is not explicitly sent in any CAN message in some embodiments. The combination of session number, overflow counter, and message counter can uniquely identify any message that was ever sent since the vehicle was initialized.

Figure 4:
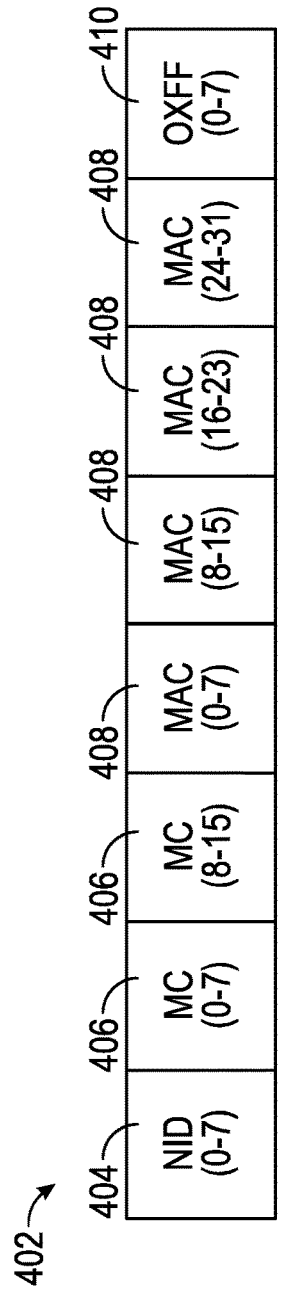
FIG. 4 is a schematic diagram illustrating an authentication message format in accordance with some embodiments.

When a node in the high-trust group 306 of FIG. 3 has a CAN message to transmit (referred to as data message), the node first sends the data message, and then sends an authentication message right after the data message. Nodes in the low-trust 304 group do not perform any authentication operations, in a sense that they do not send or verify any authentication messages. The format of the authentication message 402 is shown in FIG. 4. Each authentication message 402 contains 1-byte node ID (NID) 404, 2-byte message counter (MC) 406, 4-byte message authentication code (MAC) 408, and 1-byte authentication marker (0xFF) 410. The authentication marker 410 is used together with NID 404 and MC 406 to help the receiver verify this is a follow-up authentication message 402. The calculation of MAC 408 is as follows in equation 1 (Eqn 1):

$$MAC=OWF(data, NID, session, OC, MC, Kh) \quad (Eqn\ 1)$$

data is the data field 206 of FIG. 2 of the corresponding data message, OC denotes the overflow counter, and OWF is a cryptographic one-way function which ensures that (i) it is insufficient to learn Kh from MAC, data, NID, session, OC and MC, and (ii) a faked MAC' generated without knowing Kh can be detected with high probability.

Figure 5:
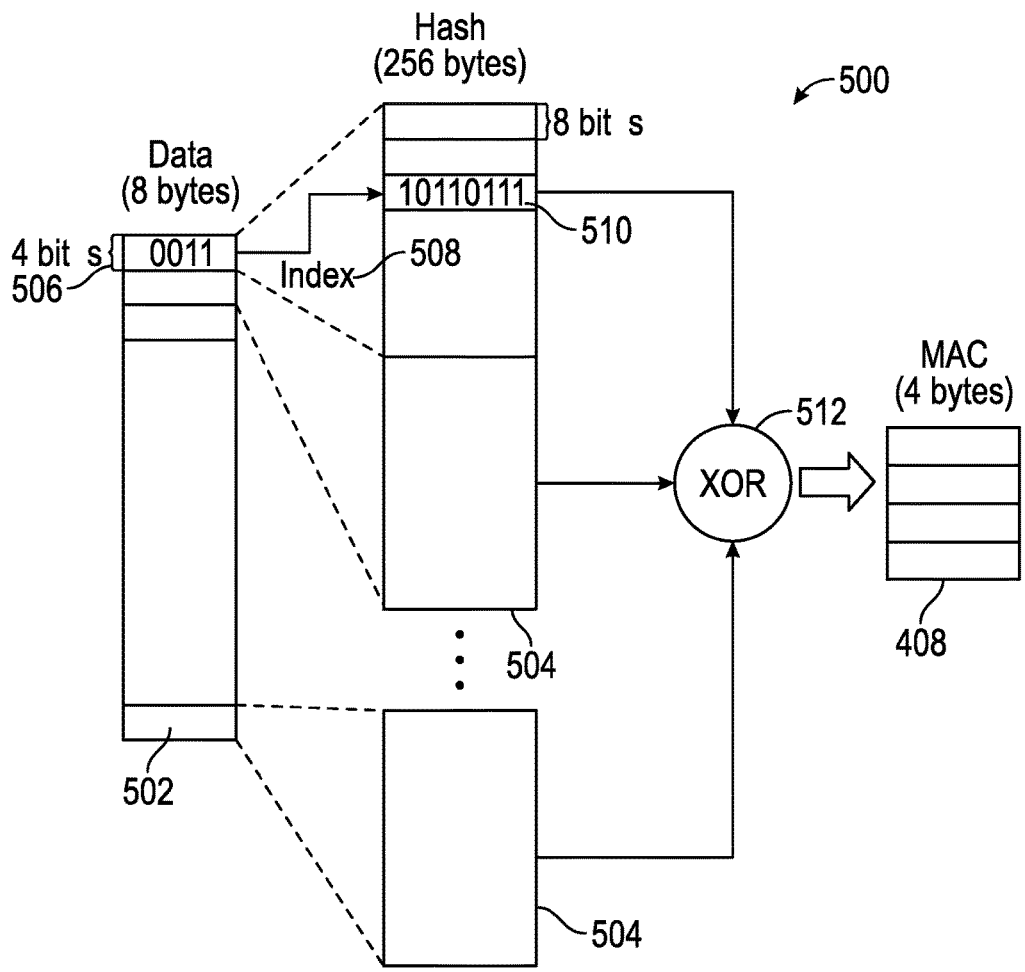
FIG. 5 is a schematic diagram illustrating a Binding, Mapping, Extraction (BME) on hash based on data in accordance with some embodiments.

The key challenge quickly generates or verifies MAC when data is present at the sender or the receiver. Since computing a cryptographic function on resource-constrained ECUs 102 could cause prohibitively high message processing delay, the embodiments decompose OWF into two parts: a lightweight online calculation component, and a heavyweight offline calculation component that can be conducted in advance without using data. In particular, OWF is constructed as follows in equation 2 (Eqn 2) and equation 3 (Eqn 3):

$$hash=HASH(NID|session|OC-MC|Kh) \quad (Eqn\ 2)$$

$$MAC=BME(hash,data) \quad (Eqn\ 3)$$

where | denotes concatenation, HASH is a cryptographic hash function, such as SHA-3, and BME is a function that performs Binding, Mapping, Extraction on hash based on data. The design of BME 500 is shown in FIG. 5. Assuming a 256-bytes hash value 504 has been pre-calculated according to Equation 3, the first step of BME 500 is to divide the data 502 to be authenticated into a sequence of 4-bit strings 506 and translate each of them into an integer in [0,15]; the i-th integer di is used as an index 508 to find the di-th byte 510 of the i-th 16-bytes segments of the hash value 504, and the final output of BME 500, i.e., MAC 408, is a 4-bytes XOR value by XORing d1 and d5, d2 and d6, and etc. That is, the exclusive or (XOR) function 512 is applied to d1 and d5 to produce one byte, then d2 XOR d6 produces another byte, d3 XOR d7 produces another byte. These intermediate bytes are then further combined with a further round of exclusive or function, to produce the MAC 408. Variations of these operations to produce variations of the MAC 408 are readily devised in accordance with the teachings herein. It should be appreciated that the design of BME 500 ensures there is an one-to-one mapping between data 502 and MAC 408, which implies that an adversary cannot claim a fake message data' for a MAC 408 that was created by a legitimate party for a different data. In addition, since BME 500 involves a limited number of simple bit operations, BME 500 incurs very little computational delay.

Figure 6:
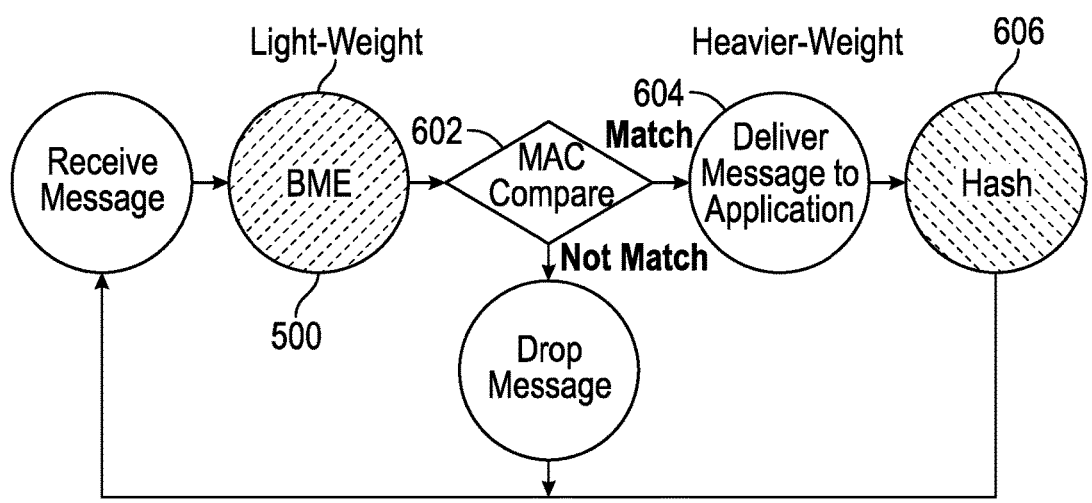
FIG. 6 is a schematic diagram illustrating the message verification process at the receiver in accordance with some embodiments.

Moving to FIG. 6, the calculation of HASH 606 is independent of data, and therefore can be performed beforehand, i.e., offline. For example, computing HASH 606, i.e., the hash value 504 of FIG. 5 for the next message authentication operation 602, can be scheduled right after delivering the current message to the application recited in operation 604. Similarly, at the sender end, a new hash value 504 can be computed right after the current message is sent out. The benefit of introducing offline computation for heavyweight cryptographic functions is to greatly reduce online message processing delay so that messages can be sent out or delivered to the receiver's application instantly while preserving the same level of security as performing cryptographic functions at the run time.

Referring to FIGS. 1-4, in the spoofed message injection attack, the adversary (e.g., a compromised ECU 102 in the low-trust group 304) attempts to send a spoofed message by claiming itself as another ECU 102 in the high-trust group 306, i.e., using a node ID 404 that is not assigned to it in the authentication message. Since the node ID 404 is bound to the secret key Kh of the trust group, a valid MAC 408 is required so that the receiving nodes can accept the authentication message that contains this node ID 404. As a result, any node in the low trust group 304 will be detected with overwhelmingly high probability if the node attempts to inject or modify a message on the CAN bus 104. In particular, the chance for the adversary to inject an 8-bytes spoofed message without being detected is $2^{-64}$~one in $6.25 \times 10^{20}$, while the chance for modifying a single bit of a message sent by a legitimate node without being detected is $2^{-8}$~0.39%.

One way to launch the replay attack is as follows. The adversary who has direct access to the CAN bus 104 records both the data message and the authentication message, interrupt the transmission of the authentication message by modifying the cyclic redundancy check (CRC) or ACK fields which are located at the end of the CAN frame 204. The interruption makes sure that the intended receivers do not verify the data message and update their message counters. The recorded message and authentication messages are replayed at a later time. The embodiments ensure that the adversary can only send the recorded message once. If the adversary attempts to send a duplicate authentication message, it will be easily detected and filtered by the receiving nodes due to the outdated message counter. If the adversary attempts to use a fresh message counter in the authentication message, the adversary needs to obtain a new MAC 408 for the modified authentication message, which requires knowledge of Kh and thus is not feasible for the adversary. Therefore, the above replay attack is essentially a delay attack, where the transmission of the original message is postponed. It should be noted that recording a particular CAN message and meanwhile interrupting its transmission is not trivial and likely impossible, because it requires the capability of precisely modifying a few bits of a CAN frame 204 on the wire, i.e., precisely changing the voltage level of the CAN bus 104 at a few particular time points. This may require the adversary to hook a specialized device that possesses such a capability to the CAN bus 104, which makes launching remote attacks next to impossible.

The adversary could try to launch the DoS attack by flooding the CAN bus 104 with a sufficiently large number of bogus CAN messages, so that any legitimate ECUs 102 would be un-able to send or receive any valuable messages. The CAN protocol is inherently vulnerable to the DoS attack, because there is not any defense or mitigation mechanism provided in the CAN protocol. However, such an attack can be easily detected e.g., based on the traffic rate. In addition, the DoS attack cannot help the adversary gain any control of the vehicle, which is against the primary goal of the adversary.

Figure 7:
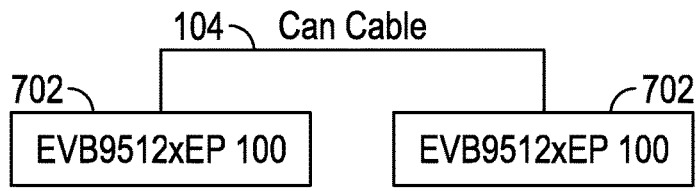
FIG. 7 is a schematic diagram illustrating the testbed for a prototype implementation in accordance with some embodiments.
Figure 8:
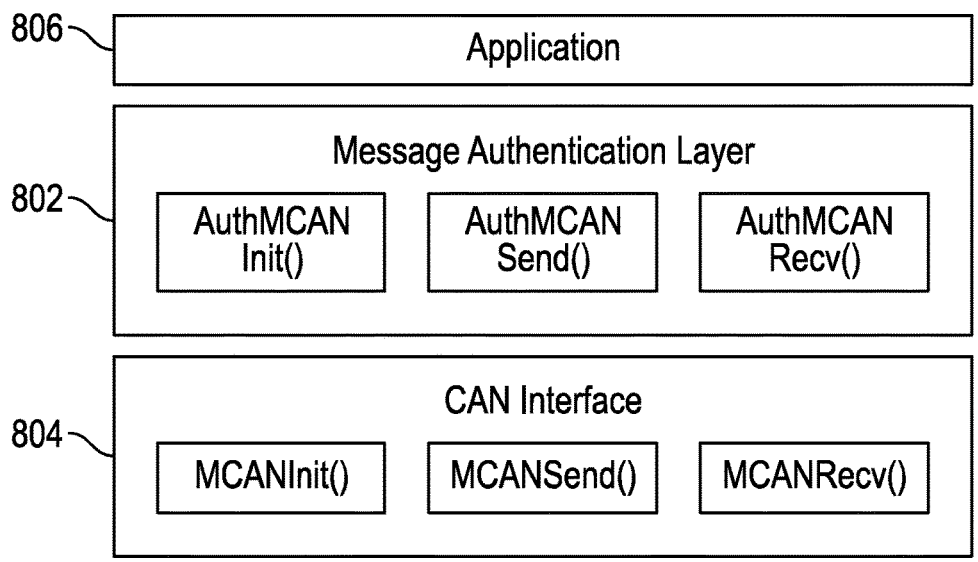
FIG. 8 is a schematic diagram illustrating the architecture of one implementation of the message authentication system in accordance with some embodiments.

FIG. 7 illustrates a testbed using automotive development boards 702 of model EVB9S12XEP100. The board is connected to a personal computer via a USB cable in order to load binary code and conduct line-by-line debugging. Each board 702 is integrated with two hex-number displays and a number of control buttons, which allow for control of the program and perform testing. We configured each board 702 to use one of the control buttons for "power on" and another one for "rekey". A Periodic Interrupt Register generated periodic interrupts every 1000 CPU (central processing unit) cycles in order to handle message sending, message receiving, and external control events. An EEPROM was configured to store Kh and session numbers, so that the program can read their previous values upon each reboot. SHA-3 was adopted as the hash function due to its high performance on low-end devices, and used the source code of SHA-3 6 without modification. As illustrated in FIG. 8, the embodiments implemented an additional security layer 802 between the original CAN interface 804 and the application 806, by wrapping the original CAN application programming interfaces (APIs) with additional security functions.

Figure 9:
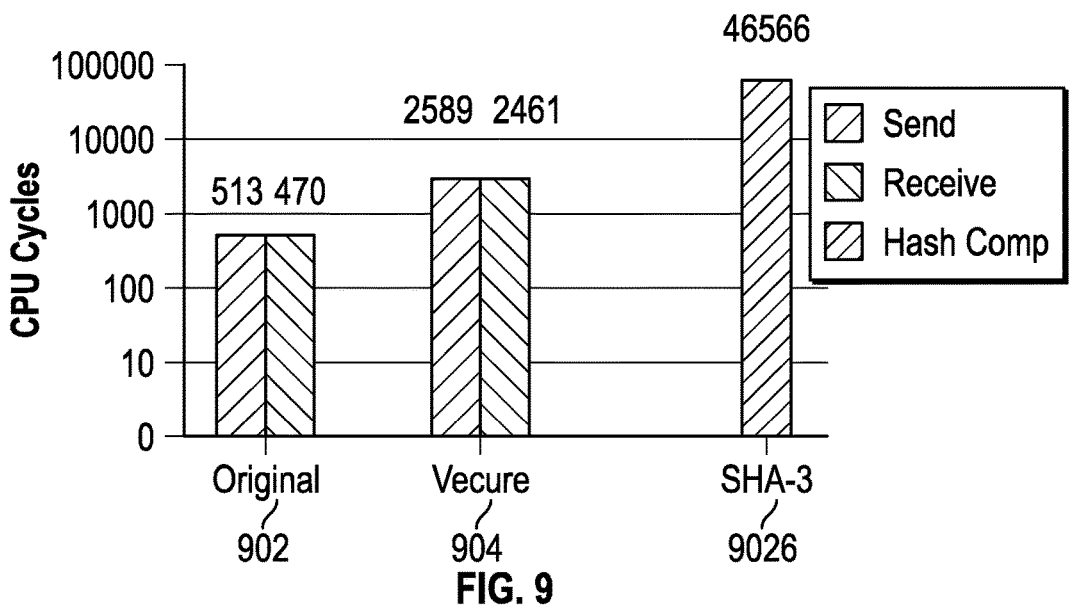
FIG. 9 is a graph illustrating the comparison of the embodiments regarding online message processing delay against two benchmarks: 1) the original CAN protocol and 2) computing SHA-3 function in accordance with some embodiments.

The online processing overheads were measured at both the sender and the receiver ends. The online message processing delay is the duration from the time when data is present to the time when the data is sent out by the sender or delivered to the application by the receiver in some embodiments. The number of CPU cycles spent to process each transmitted message is recorded by reading the main timer register at the starting and ending points. Two benchmarks to evaluate the embodiment's performance were utilized: the original CAN protocol without any security, and SHA-3 hash function. The evaluation result is shown in FIG. 9. Compared to the original 902 CAN protocol, VeCure 904 introduces an overhead of around 2000 CPU cycles for sending or receiving a CAN message, which is only 50 us additional time if it is run on a 40 MHz CPU. On the other hand, the online computational cost of VeCure is about 20 times less than that of SHA-3 906. Considering that all the existing CAN authentication solutions need to perform at least one hash function (or even more computationally expensive operations) at the run time, VeCure significantly improves the performance of CAN authentication mechanisms.

In summary, the embodiments implement a message authentication mechanism on top of the CAN protocol to filter out any spoofed messages injected by an attacker through either the OBD-II port 108 or a compromised ECU 102. VeCure adopts a trust group structure to partition ECUs 102 into different trust groups based on their trust levels, e.g., ECUs 102 without any external interfaces put into the high-trust group. The benefit of using trust groups reduces the cost of initializing and managing cryptographic keys used in message authentication. In addition, VeCure employs a message authentication scheme that allows both the sender and receiver nodes to perform heavier-weight calculations in advance in order to minimize online message processing delays.

The following embodiments include an authentication algorithm to implement this framework. The algorithm has very low processing delay for message authentication, and thus is practical for vehicular system environment. The details of the design are as follows.

Suppose node A and node B share a pre-established secret key K; A is the sender, B is the receiver, and $[m\_i]$, $i=0, 1, \ldots$ are the sequence of messages to be transmitted (each $m\_i$ is up to 8 bytes long due to CAN standards); E is the attacker (e.g. a compromised ECU 102) who can access the CAN bus 104 by modifying, dropping, and injecting messages. Both A and B first compute a hash value $h\_i=HASH(K, i)$ for the i-th message. Since the hash calculation is independent of $m\_i$, both A and B can compute the hash value before $m\_i$ is present. When $m\_i$ is present at A, A divides $m\_i$ into a number of equal-sized bit strings (e.g. 4 bits), translates each bit string into an integer index (e.g. [0, 15] for 4-bit strings), and then uses each index to locate a particular piece of data in $h\_i$ (e.g., retrieve the 5-th byte of $h\_i$, if the bit string is 0101). As a result, A will get a number of pieces of data from $h\_i$, which are XOR-ed together into a 4-byte Message Authentication Code (MAC). This MAC 408 is sent together with $m\_i$ to B, which extracts the corresponding data MAC', i.e., a verification version of the message authentication code, from the pre-calculated $h\_i$ based on the received $m\_i$ and compares MAC' against the received MAC. If this matches, authentication of this message passes; otherwise, authentication fails and the message is dropped. The evaluation of the cryptographic hash function HASH( ) is heavy-weight (taking 2 ms in some embodiments), while extracting MAC from the hash value $h\_i$ is much lighter-weight (taking less than than 100 us in some embodiments). Therefore, by adopting the offline computation of hash values in the message authentication, the embodiments can substantially reduce online message processing delay (about a 20× improvement). This offline computation based message authentication can also tolerate message dropping, e.g., if $m\_i$ is somehow lost and $m\_{i+1}$ is received by B, who currently holds $h\_i$, then B can easily catch up by calculating the new hash value $h\_{i+1}$ on the fly to verify $m\_{i+1}$, and pre-calculating $h\_{i+2}$ for $m\_{i+2}$ to be received in the future.

Figure 10:
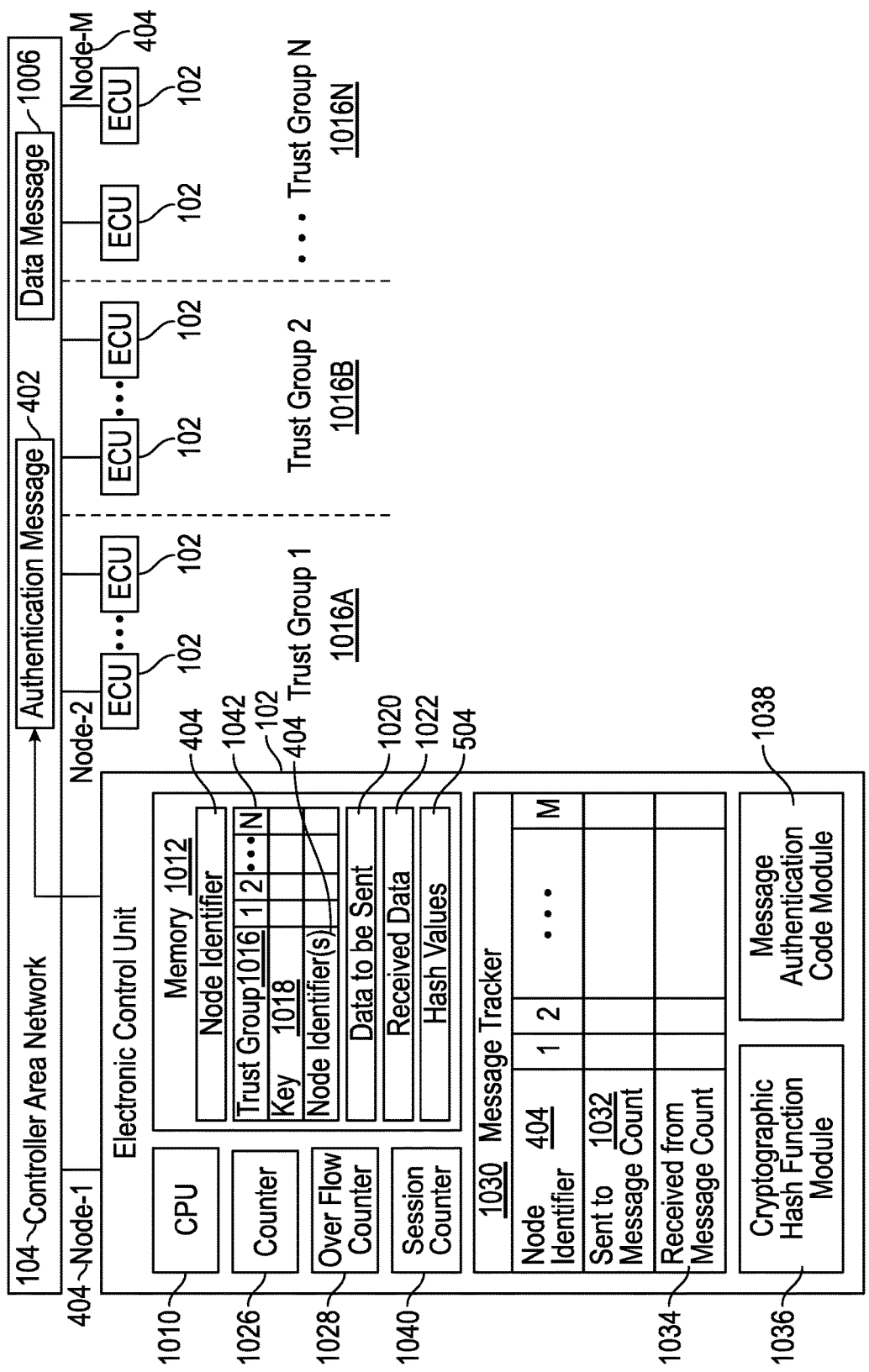
FIG. 10 is a schematic diagram of ECUs communicating on a CAN bus, applying message authentication in accordance with some embodiments.

FIG. 10 is a system diagram of ECUs 102 communicating on a CAN bus 104, applying message authentication in accordance with an embodiment of the present disclosure. The ECUs communicate via the CAN bus 104, with each communication having a data message 1006 and an authentication message 402, examples of the contents of which are described above. The ECUs are organized into trust groups 1016A, 1016B, . . . 1016N. Keys 1018 are distributed across the trust groups 1016, such that each trust group 1016A, 1016B, . . . 1016N has one or more keys 1018 associated therewith. The ECUs 102 can have similar or differing contents, computing power and embodiments, as suit the various functions and applications applicable to each ECU 102 in a vehicular environment. Particularly, some of the ECUs 102 may communicate primarily with other ECUs in their own trust group 1016 and therefore use only a key or keys 1018 shared by that trust group 1016. Some of the ECUs 102 may communicate with ECUs in other trust groups 1016, and therefore use a key or keys 1018 appropriate to communication with those other trust groups 1016. Some or all of the ECUs 102 may have some or all of the features in the embodiment depicted in FIG. 10, or may have a subset, a superset, or variations of these features. Some ECUs 102 may communicate with other ECUs 102 without using a key 1018.

In the embodiment of an ECU 102 depicted in FIG. 10, the ECU 102 has a CPU 1010, a memory 1012, a counter 1026, an overflow counter 1028, a session counter 1040, a message tracker 1030, a cryptographic hash function module 1036, and a message authentication code module 1038. Each of these is further described below. The CPU 1010 can be a RISC (reduced instruction set computer), a controller, a multiprocessor, a parallel processor or other processor. The counter 1026 can be a hardware counter or a software-based counter. In some embodiments the overflow counter 1028 is included in the counter 1026. The session counter 1040 is initialized as zero and incremented each time the CAN bus 104 is powered up or the vehicle is started, as described above. In some embodiments, the session counter 1040 employs the counter 1026, or is included in the counter 1026. The memory 1012 preferably includes non-volatile memory, such as flash memory, and the non-volatile memory is used for storing information that is to be preserved from session to session, i.e., that should not be erased when the vehicle is inactive. In some embodiments, the memory 1012 includes read only memory (ROM), programmable read-only memory (PROM), or erasable programmable read-only memory (EPROM), which may be used for storing values that do not change from session to session, such as node identifiers 404, trust groups 1016 and/or keys 1018. The memory 1012 includes the node identifier 404 associated with the ECU 102. For example, the node identifier 404 of the left-most ECU depicted in FIG. 10 is NODE 1, and this information is stored in the memory 1012 of that ECU 102. The memory 1012 includes a data structure 1042, such as a table, a list, a database, or other mechanism for organizing associated information. The data structure 1042 associates the trust groups 1016, the keys 1018 and the node identifiers 404. For example a first trust group 1016A could have one or more keys 1018 and include one or more nodes as members of the trust group 1016A, each of which has a node identifier 404, and this information could be associated in a column in the data structure 1042. Other mechanisms for associating such information, such as links, pointers, directories, files, etc. are readily devised in accordance with the teachings herein. The memory 1012 includes data to be sent 1020. Such data could include status information, parameter values, messages, requests, or other information in various formats to be communicated from one ECU 102 to one or more other ECUs 102. This data could be organized individually, or in a queue, an array, or other structure. The memory 1012 includes received data 1022, which could have contents and be organized in a similar manner to or a differing manner from the data to be sent 1020. The received data 1022 could be information from one or more other ECUs 102, and could be retained long-term or deleted after usage by the ECU 102. The memory 1012 includes hash values 504, which are computed or otherwise generated in advance of sending the data to be sent 1020, and/or in advance of receiving the received data 1022, as described above.

The message tracker 1030 tracks node identifiers 404, and message counts for messages transmitted and messages received. The sent-to message count 1032 has the count of the most recent message sent to the node according to the node identifier 404, for each of the nodes to which the ECU 102 sends messages. The received-from message count 1034 has the count of the most recent message received from the node according to the node identifier 404, for each of the nodes from which the ECU 102 receives messages. The node identifiers 404, sent-to message counts 1032, and received-from message counts 1034 can be organized in various formats, such as a table, a list, or other data structure. In some embodiments, this information is stored in the memory 1012 and is associated with the message tracker 1030. For example, this information could be stored in the data structure 1042. The message tracker 1030 employs the counter 1026, and the overflow counter 1028 as needed if or when the counter 1026 overflows, to generate the sent-to message count 1032 and the received-from message count 1034.

The cryptographic hash function module 1036 calculates the hash values 504, using the techniques described above, or variations thereof. For example, to calculate a hash value 504 for a message to be received from an ECU 102 specified by a node identifier 404, the CPU 1010 could direct the cryptographic hash function module 1036 to look up the received-from message count 1034 associated with that node identifier 404. The CPU 1010 then adds one to that received-from message count 1034, thus generating the message count of the message to be received from that node. The hash value 504 is then generated by the cryptographic hash function module 1036 from the node identifier 404 of the node from which the message is to be received, the session count from the session counter 1040, the message count and overflow count, if applicable, from the received-from message count 1034 as incremented by one above, and the appropriate key 1018 of the trust group 1016 to which the node belongs. The hash value 504 is then stored in the memory 1012. The hash value 504 is retrieved for use by the message authentication code module 1038, after the data is received from the node of interest, e.g., in response to receiving a data message 1006 and/or storing the received data 1022 in the memory 1012.

As a further example, to calculate a hash value 504 for a message to be sent to an ECU 102, a similar process is followed using the sent-to message count 1032. The CPU 1010 could direct the cryptographic hash function module 1036 to look up the sent-to message count 1032 associated with a node identifier 404, and add one to that sent-to message count 1032, thus generating the message count of a message to be sent. The hash value 504 is then generated by the cryptographic hash function module 1036 from the node identifier 404 of the node to which the message is to be sent, the session count from the session counter 1040, the message count and overflow count, if applicable, from the sent-to message count 1032 as incremented by one above, and the appropriate key 1018 of the trust group 1016 to which the node belongs. The hash value 504 is then stored in the memory 1012. The hash value 504 is retrieved for use by the message authentication code module 1038, after the data to be sent 1020 becomes available. Offline calculation of hash values 504 can be performed by the ECU 102 when the ECU 102 is not actively involved in processing the data received in a data message 1006 or in preparation for sending a data message 1006. Such action improves latency by removing the calculation of the hash value 504 from the critical path of calculating a message authentication code 408 based on data to be sent 1020 or received data 1022.

The message authentication code module 1038 calculates message authentication codes 408, using the techniques described above, or variations thereof. For example, to calculate a message authentication code 408 for a message received from an ECU 102 specified by a node identifier 404, the CPU 1010 could direct the message authentication code module 1038 to look up the hash value 504 associated with the message count of the received data 1022 and associated with the node identifier 404 (i.e., the received-from message count 1034 for that node identifier 404). The message authentication code module 1038 then calculates the verification version of the message authentication code based on the received data 1022 (as extracted from the data message 1006 upon receipt) and the looked up hash value 504. Either the CPU 1010 or the message authentication code module 1038 could then compare the verification version of the message authentication code to the message authentication code received in association with the received data 1022 (e.g., in the authentication message 402 immediately following the data message 1006, where these are received by the ECU 102). If the message authentication code matches the verification version of the message authentication code, this authenticates the received data 1022. If these do not match, the received data 1022 is discarded as not authenticated.

As a further example, to calculate a message authentication code for a message to be sent to an ECU 102 specified by node identifier 404, the CPU 1010 could direct the message authentication code module to look up the hash value 504 associated with the message count of the data to be sent 1020 and associated with the node identifier 404 (i.e., the sent-to message count 1032 for that node identifier 404, incremented by one). The message authentication code module 1038 then calculates the message authentication code based on the data to be sent 1020 and the looked up hash value 504. The CPU 1010 can then assemble the data to be sent 1020 into a data message 1006, and the message authentication code into an authentication message 402, and send these to the node of interest.

Figure 11A:
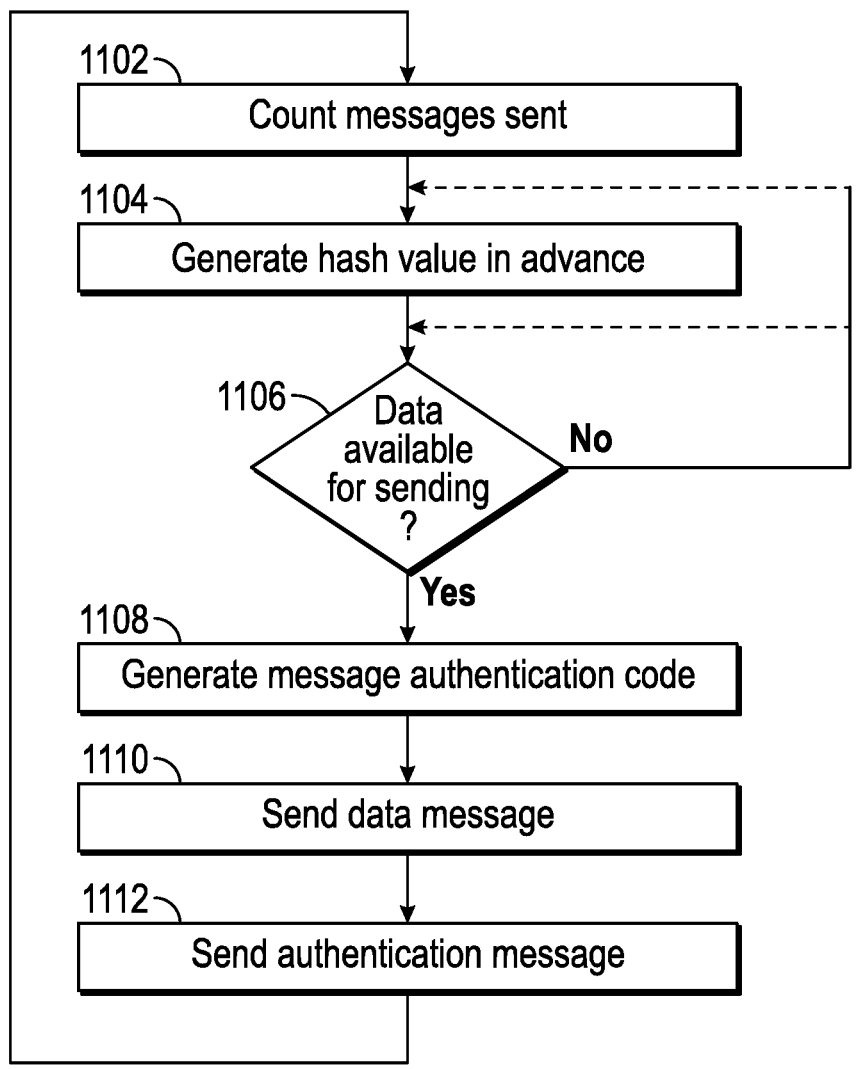
FIG. 11A is a flow diagram of a method for sending messages with a message authentication code in accordance with some embodiments.
Figure 11B:
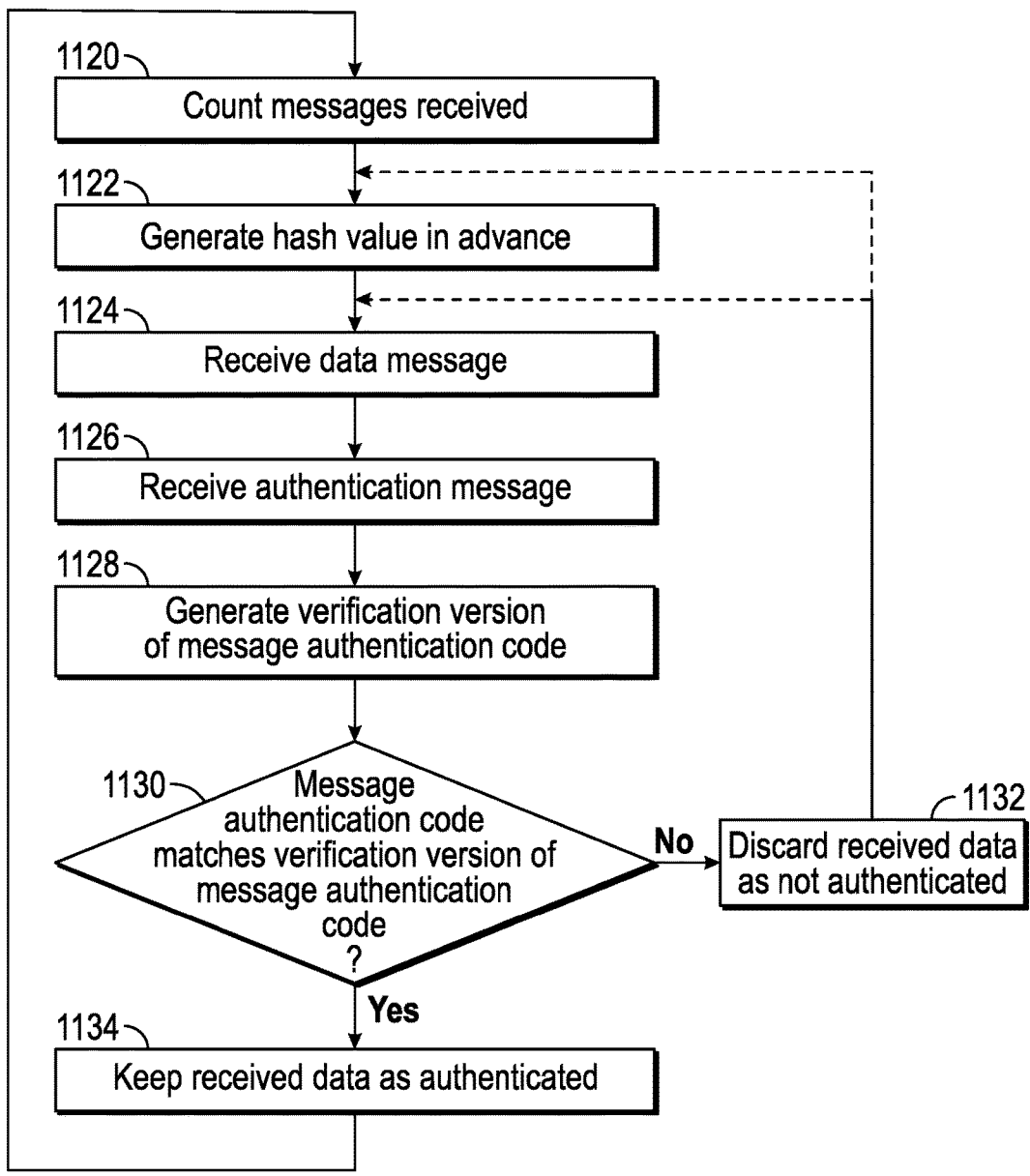
FIG. 11B is a flow diagram of a method for receiving messages with a message authentication code in accordance with some embodiments.

Operation of various embodiments of ECUs 102 in a vehicular system is described below in a method, which is in two parts. It should be appreciated that the method for sending messages with a message authentication code, as shown in FIG. 11A, can be practiced by a first ECU 102 sending a message to a second ECU 102, or can be practiced by the second ECU 102 sending a message to the first ECU 102. And, the method for receiving messages with a message authentication code, as shown in FIG. 11B can be practiced by the second ECU 102 receiving the message from the first ECU 102, or can be practiced by the first ECU 102 receiving a message from the second ECU 102. In other words, the same ECU 102 can practice both of these methods, e.g., for sending and receiving differing messages, or differing ECUs 102 can practice these methods, e.g., one ECU 102 for sending a message and another ECU 102 for receiving the same message.

FIG. 11A is a flow diagram of a method for sending messages with a message authentication code. Messages sent are counted, in an action 1102. The message counts can be tracked for multiple ECUs to which messages are sent. Hash values are generated in advance of sending messages, in an action 1104. The hash values are based on the message counts per the action 1102, and maybe based on other factors as described above. In a decision action 1106, it is determined whether there is data available for sending. If there is no data available for sending, the flow branches back to either the decision action 1106, to continue waiting for data, or back to the action 1104, to generate further hash values. This is depicted by the dashed lines in the flow diagram, and variations of the method may practice either of these flows, or both, e.g., with further decision action or actions consistent with the teachings disclosed herein. If there is data available for sending, flow advances to the action 1108.

A message authentication code is generated in the action 1108. This is based on the hash value that was generated in advance of availability of the data (in the action 1104), and is further based on the data itself, as described above. The data message is sent, in the action 1110. The data message includes the data that became available for sending, per the decision action 1106. The authentication message is sent, in an action 1112. The authentication message includes the message authentication code generated in the action 1108. By moving the calculation of the hash value (in the action 1104) out of the critical path for generating the message authentication code i.e., by generating the hash value in advance of having the data available for sending, latency is reduced between assembling data for the data message and sending the authentication message, with the message authentication code. That is, latency between assembling the data for the data message and sending the authentication message would be longer if the hash value were generated after assembling the data for the data message.

FIG. 11B is a flow diagram of a method for receiving messages with a message authentication code. Messages received are counted, in an action 1120. The message counts can be tracked for multiple ECUs from which messages are received. A hash value is generated in advance of receiving a message, in an action 1122. This action 1122 could be performed in batch mode for multiple hash values in advance of receiving multiple messages from one ECU or many ECUs, or could be performed in individual calculations before each message is received, for a hash value relating to a message count, or combinations thereof. One mechanism is to produce a hash value for the next message to be received from a particular node, immediately after receiving a message from that node (and thus prior to the next message from that node). A data message is received, in an action 1124. An authentication message is received in an action 1126.

A verification version of a message authentication code is generated, in an action 1128. This is based on the received data and the hash value generated in advance of receiving the data, using a message count per the action 1120. In the decision action 1130, it is determined whether the message authentication code (as received in the authentication message in the action 1126 and associated with the data message received in the action 1124) matches the verification version of the message authentication code. If the answer is no, there is no match, then the received data is discarded as not authenticated, in the action 1132. Flow then branches back to either the action 1124, to receive another data message, or the action 1122, to continue generating another hash value in advance. This is depicted by the dashed lines in the flow diagram, and variations of the method may practice either of these flows, or both, e.g., with further decision action or actions consistent with the teachings disclosed herein. If the answer is yes there is a match, then the data is kept as authenticated, in the action 1134. Flow proceeds back to the action 1120, to count the messages received and generate another hash value.

By moving the calculation of the hash value (in the action 1122) out of the critical path for generating the verification version of the message authentication code, i.e., by generating the hash value in advance of receiving the data message, latency is reduced from receiving the data message and receiving the authentication message to determining whether the message authentication code matches the verification version of the message authentication code. That is, latency between receiving the data message and the authentication message and determining whether the data is authenticated would be longer if the hash value were generated after receiving the data message.

Figure 12:
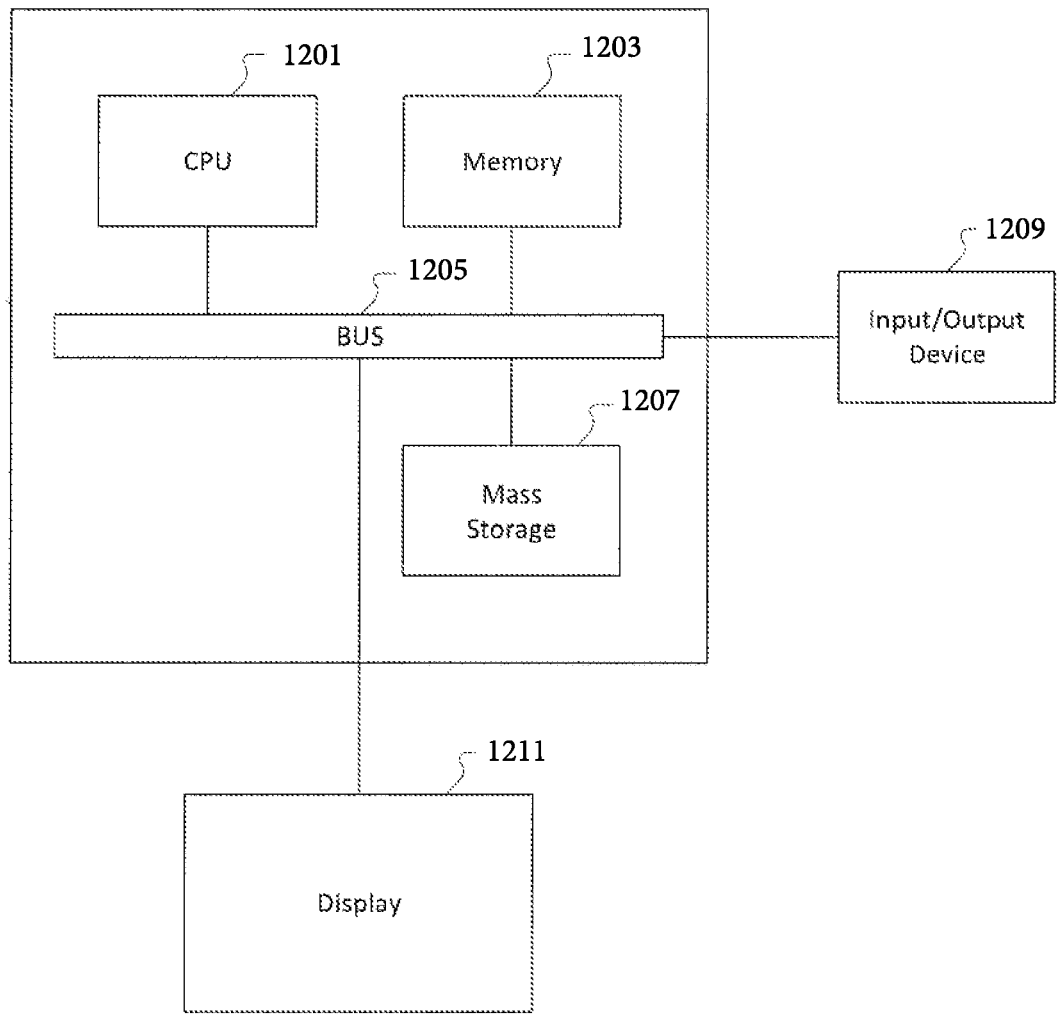
FIG. 12 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 12 is an illustration showing an exemplary computing device which may implement the embodiments described herein. The computing device of FIG. 12 may be used to perform embodiments of the functionality for producing and verifying message authentication codes in accordance with some embodiments. The computing device includes a central processing unit (CPU) 1201, which is coupled through a bus 1205 to a memory 1203, and mass storage device 1207. Mass storage device 1207 represents a persistent data storage device such as a floppy disc drive or a fixed disc drive, which may be local or remote in some embodiments. The mass storage device 1207 could implement a backup storage, in some embodiments. Memory 1203 may include read only memory, random access memory, etc. Applications resident on the computing device may be stored on or accessed via a computer readable medium such as memory 1203 or mass storage device 1207 in some embodiments. Applications may also be in the form of modulated electronic signals modulated accessed via a network modem or other network interface of the computing device. It should be appreciated that CPU 1201 may be embodied in a general-purpose processor, a special purpose processor, or a specially programmed logic device in some embodiments.

Display 1211 is in communication with CPU 1201, memory 1203, and mass storage device 1207, through bus 1205. Display 1211 is configured to display any visualization tools or reports associated with the system described herein. Input/output device 1209 is coupled to bus 1205 in order to communicate information in command selections to CPU 1201. It should be appreciated that data to and from external devices may be communicated through the input/ output device 1209. CPU 1201 can be defined to execute the functionality described herein to enable the functionality described with reference to FIGS. 1-11. The code embodying this functionality may be stored within memory 1203 or mass storage device 1207 for execution by a processor such as CPU 1201 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. While the embodiments are applied to a vehicle system this is not meant to be limiting. In addition, while the vehicle system may be a land, sea, or air based system, the embodiments may be extended to non-vehicle systems also.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for authenticating messages, comprising:
calculating a hash value based on a key and a message count value;
receiving from a first electronic control unit, a data message associated with the message count value;
receiving from the first electronic control unit, an authentication message that includes the message count value and a message authentication code derived from the data message, the message count value and the key, wherein the calculating the hash value is performed by a second electronic control unit prior to the receiving the data message and prior to the receiving the authentication message, wherein calculating the hash value prior to the receiving the data message and prior to the receiving the authentication message acts to decrease a latency;
applying, by the second control unit, portions of the received data message as an index into the hash value to look up portions of the hash value;
combining, by the second control unit, the portions of the hash value to form a verification version of the message authentication code; and
determining, by the second control unit, whether the message authentication code matches the verification version of the message authentication code.

2. The method of claim 1, wherein the latency is from the receiving the data message and receiving the authentication message until the determining.

3. The method of claim 1, wherein:
the key is stored in each of the first electronic control unit and the second electronic control unit; and
the message count value is determined at each of the first electronic control unit and the second electronic control unit.

4. The method of claim 1, wherein:
applying portions of the data message to look up portions of the hash value includes using the portions of the data message as pointers to the portions of the hash value; and
combining the portions of the hash value includes concatenating exclusive ORed portions of the hash value, as pointed to by the portions of the data message.

5. The method of claim 1, further comprising:
calculating a plurality of hash values based on the key and a plurality of message count values, wherein the hash value is included in the plurality of hash values and the message count value is included in the plurality of message count values; and
identifying the hash value from the plurality of hash values, based on receiving the message count value in the authentication message.

6. The method of claim 1, wherein calculating the hash value is further based on a node identification (ID) and a session count.

7. The method of claim 1, further comprising:
calculating, at the first electronic control unit, the hash value calculated at the second electronic control unit, based on the key and the message count value as applied at the second electronic control unit, wherein both of the first electronic control unit and the second electronic control unit track the message count value and have the key;
generating the message authentication code at the first electronic control unit based on the hash value calculated at the first electronic control unit and the data message which is to be sent;
sending, from the first electronic control unit to the second electronic control unit, the data message and the authentication message, wherein the calculating the hash value is performed by the first electronic control unit prior to assembling the data for the data message and acts to decrease a latency from the assembling the data for the data message and the sending the authentication message.

8. A tangible, non-transitory, computer-readable media having instructions thereupon which, when executed by a processor, cause the processor to perform a method comprising:
counting messages received from an electronic control unit;
deriving a message count value, for a message to be received from the electronic control unit, based on the counting;
generating a hash value from the message count value and a key, wherein generating the hash value is prior to receiving a data message and prior to the receiving an authentication message to decrease a latency;
receiving the data message associated with the message count value from the electronic control unit via a vehicular communication network or bus;
receiving the message count value and a message authentication code, from the electronic control unit, via the vehicular communication network or bus;
generating a verification version of a message authentication code from the received data message and the hash value corresponding to the message count value, by using portions of the received data message as an index to point to portions of the hash value and combining the portions of the hash value to form the verification version of the message authentication code; and verifying whether the message authentication code and the verification version of the message authentication code match.

9. The computer-readable media of claim 8, wherein the method further comprises:
counting messages sent to the electronic control unit;
deriving a further message count value, for a message to be sent to the electronic control unit, based on the counting messages sent to the electronic control unit;
generating a further hash value from the further message count value and the key;
assembling a further data message, with further data therein;
generating a further message authentication code from the further data and the further hash value;
sending the further data message to the electronic control unit via the vehicular communication network or bus; and
sending the further message count and the further message authentication code, to the electronic control unit via the vehicular communication network or bus.

10. The computer-readable media of claim 8, wherein generating the hash value includes:
forming a concatenation of a node identification (ID), a session count, the message count value, an overflow count value and the key; and
performing a cryptographic hash calculation on the concatenation.

11. The computer-readable media of claim 8, wherein generating the verification version of the message authentication code includes:
dividing the data into a sequence of strings;
translating each string of the sequence of strings into an integer value;
applying the integer value of each string of the sequence strings as an index to find a portion of the hash value;
applying an exclusive or (XOR) function to pairs of portions of the hash value, as pointed to by pairs of integer values of pairs of strings from the sequence of strings, to form intermediate values;
applying the exclusive or function to pairs of the intermediate values to form portions of the message authentication code; and
concatenating the portions of the message authentication code, to form the message authentication code.

12. The computer-readable media of claim 8, wherein the method further comprises:
storing a plurality of keys, each key of the plurality of keys associated with a trust group of a plurality of trust groups, a plurality of electronic control units organized according to the plurality of trust groups;
tracking message count values of messages sent to each of the plurality of electronic control units;
generating hash values and message authentication codes for messages to be sent to the plurality of electronic control units, based on the plurality of keys and message count values derived from the message count values of messages sent, in accordance with association of keys, electronic control units and trust groups;
tracking message count values of messages received from each of the plurality of electronic control units; and
generating hash values and verification versions of message authentication codes for messages to be received from the plurality of electronic control units, based on the plurality of keys and message count values derived from the message count values of messages received, in accordance with the association of keys, electronic control units and trust groups.

13. The computer-readable media of claim 8, wherein:
the data message includes a plurality of data bytes; and
an authentication message includes a node identification, the message count value, the message authentication code, and an authentication marker.

14. A vehicular system, comprising:
an electronic control unit configured to couple to a vehicular communication network or bus, the electronic control unit having a hash calculator, a message authentication code generator, and a memory configured to store a key and at least one hash value;
the electronic control unit configured to apply the hash calculator to a message count value and the key to produce a hash value in advance of receiving a data message having data and associated with the message count value, wherein producing the hash value prior to the receiving the data message and prior to receiving an authentication message acts to decrease a latency;
the electronic control unit configured to generate a verification version of a message authentication code via application of the message authentication code generator to the data, the message count value and the hash value, in response to receiving the data message associated with the message count value and receiving an authentication message having the message count value and a message authentication code, with the message authentication code generator using portions of the received data message to index into the hash value and look up portions of the hash value, and the message authentication code generator combining the portions of the hash value to form the verification version of the message authentication code; and
the electronic control unit configured to compare the verification version of the message authentication code to the message authentication code received in the authentication message, to verify the data received in the data message.

15. The vehicular system of claim 14, further comprising:
a message counter, implemented in hardware, firmware, software executing on a processor, or a combination thereof; and
the electronic control unit configured to apply the message counter to count messages received, and to determine the message count value for a next data message to be received, wherein the electronic control unit applies the message count value for the next data message to be received in producing the hash value in advance of receiving the data message.

16. The vehicular system of claim 14, further comprising:
the electronic control unit configured to apply the hash calculator to a further message count value and the key to produce a further hash value in advance of sending a further data message having further data and associated with the further message count value;
the electronic control unit configured to generate a further message authentication code via application of the message authentication code generator to the further data, the further message count value and the further hash value; and
the electronic control unit configured to send the further data message having the further data, and send a further authentication message having the further message count value and the further message authentication code.

17. The vehicular system of claim 14, further comprising:
the memory configured to store a node identification;
the electronic control unit having a session counter, configured to increment a session count at a start of a session; and
a message counter, implemented in hardware, firmware, software executing on a processor, or combination thereof, and configured to count transmitted messages and to count received messages;
the electronic control unit configured to apply the hash calculator to produce a hash value for a message to be transmitted based on the key, the node identification, the session count, and a message count of the message to be transmitted; and
the electronic control unit configured to apply the hash calculator to produce a hash value for a message to be received based on the key, the node identification, the session count, and a message count of the message to be received.

18. The vehicular system of claim 14, further comprising:
the vehicular communication network or bus, wherein the electronic control unit is coupled thereto as a first electronic control unit;
a second electronic control unit, coupled to the vehicular communication network or bus, the second electronic control unit having a memory configured to store a same key as the key of the first electronic control unit;
each of the first electronic control unit and the second electronic control unit having one or more counters configured to count messages sent to each of a plurality of electronic control units and configured to count messages received from each of the plurality of electronic control units; and
each of the first electronic control unit and the second electronic control unit configured to apply message count values from the one or more counters in producing hash values based on message count values and the key prior to receiving authentication messages corresponding to the message count values.

19. The vehicular system of claim 14, further comprising:
a plurality of electronic control units, organized into a plurality of trust groups;
each trust group of the plurality of trust groups having a key specific to the trust group and distributed among electronic control units belonging to the trust group, which are configured to apply the key specific to the trust group in producing hash values.

20. The vehicular system of claim 14, further comprising:
the electronic control unit having a message counter configured to count messages received and to generate the message count value for a next message to be received; and
the electronic control unit having an overflow counter configured to count overflows of the message counter, wherein the hash value is further based on an overflow count from the overflow counter.

\* \* \* \* \*